(12) United States Patent
Shirakyan

(10) Patent No.: US 10,694,097 B1
(45) Date of Patent: Jun. 23, 2020

(54) METHOD, APPARATUS AND SYSTEM FOR AN AUTONOMOUS ROBOTIC PHOTO BOOTH

(71) Applicant: Greg Shirakyan, Kirkland, WA (US)

(72) Inventor: Greg Shirakyan, Kirkland, WA (US)

(73) Assignee: Emergent Machines, Inc., Kirkland, WA (US)

( * ) Notice: Subject to any disclaimer, the term of this patent is extended or adjusted under 35 U.S.C. 154(b) by 0 days.

(21) Appl. No.: 15/823,308

(22) Filed: Nov. 27, 2017

Related U.S. Application Data

(60) Provisional application No. 62/426,950, filed on Nov. 28, 2016.

(51) Int. Cl.
*H04N 5/232* (2006.01)
*G06K 9/00* (2006.01)
*H04N 1/00* (2006.01)

(52) U.S. Cl.
CPC ..... *H04N 5/23222* (2013.01); *G06K 9/00369* (2013.01); *H04N 1/00289* (2013.01); *H04N 5/23218* (2018.08)

(58) Field of Classification Search
CPC .............................................. H04N 5/232222
USPC ....................................................... 348/207.11
See application file for complete search history.

(56) References Cited

U.S. PATENT DOCUMENTS

2010/0157075 A1\* 6/2010 Yoshizumi ............. G06K 9/209
348/211.9

\* cited by examiner

*Primary Examiner* — Joel W Fosselman
(74) *Attorney, Agent, or Firm* — Law Office of Mark A. Thomas

(57) ABSTRACT

A Robotic Photo booth is described to facilitate automated photography vending machine operating in commercial and public settings, such as venues, event and family centers, shopping malls. The Robotic Photo booth uses sensor data to analyze the environment in real time, find human subjects, physically aim a photographic camera, decide the timing of the shot and produce visual art that people consider desirable. The behavior of the Robotic Photo booth is controlled by the software running on a Control Unit, which allows a completely autonomous, hands-free, zero-instruction workflow to attract and photograph human subjects of all backgrounds, age groups and ability levels. As such, it is a significant improvement over existing solutions (traditional photo booths) that require explicit human input (e.g. using a touch screen, physically moving the booth) to accomplish the same goal.

8 Claims, 9 Drawing Sheets

METHOD, APPARATUS AND SYSTEM FOR AN AUTONOMOUS ROBOTIC PHOTO BOOTH

PRIORITY

This application claims priority for provisional application with application No. 62/426,950, filed Nov. 28, 2016 with the same inventor and titled "Autonomous Robotic Photo booth."

BACKGROUND

A typical commercially available photo booth is a vending machine-style apparatus installed at venues or deployed on per-event basis at parties and events. Ultimately, it is a device that allows people attending the venue or an event to produce photographs of themselves in printed or digital formats. The primary purpose of a photo booth is entertainment for guests at events, parties and a revenue source for persons or businesses affiliated with the photo booth.

The main function of a photo booth is to create a fun, simple workflow for the guests.

Nonetheless, traditional photo booths suffer a number of usability challenges, such as, the following.

Lack of Control due to Fixed position—A photographic camera being in a fixed position fails to readily accommodate users with significantly different heights or users who are not positioned close to the center of the camera's view.

Lack of Creativity—Photo booths require an explicit action from users or attendants to initiate the shot (e.g. touching a screen to initiate a countdown), combined with a fixed position of the photographic camera, such devices cannot capture subjects (e.g. guests at the party) in their natural state, like a human photographer can. Consequently, photos produced by traditional photo booths look unmistakably 'staged'.

Figure 1:
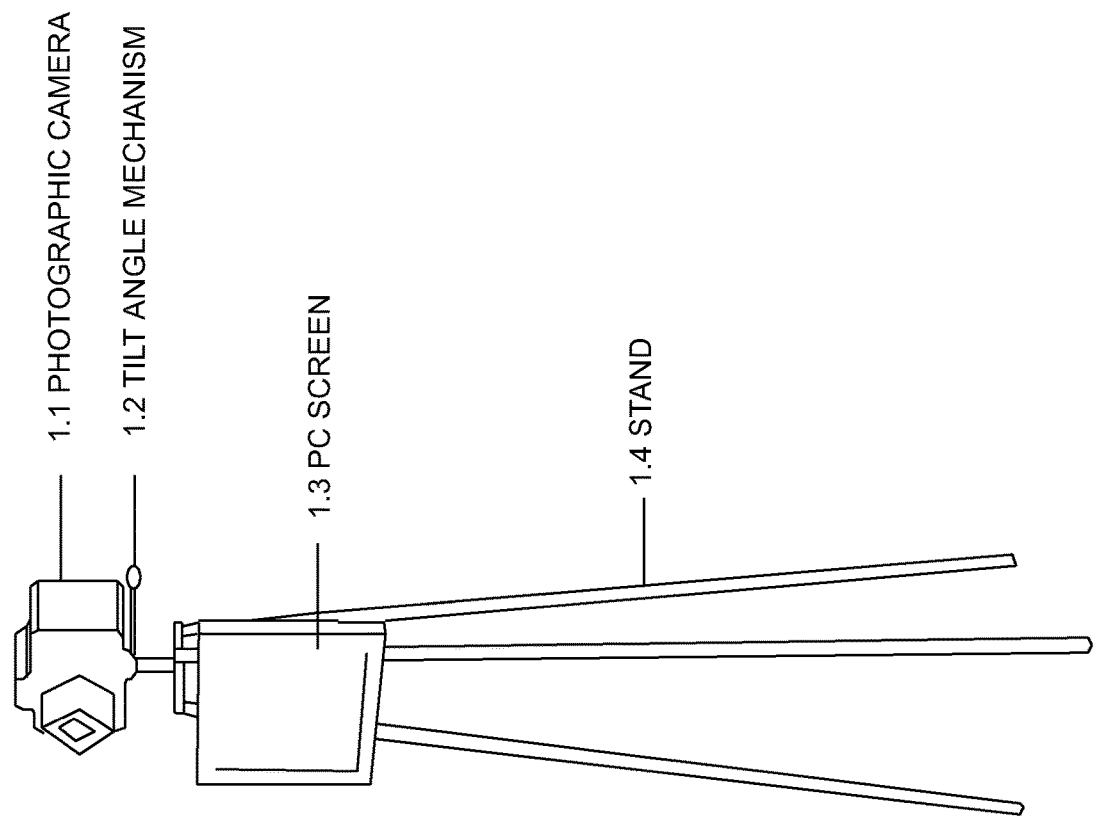
FIG. 1 is Prior Art.
Figure 2:
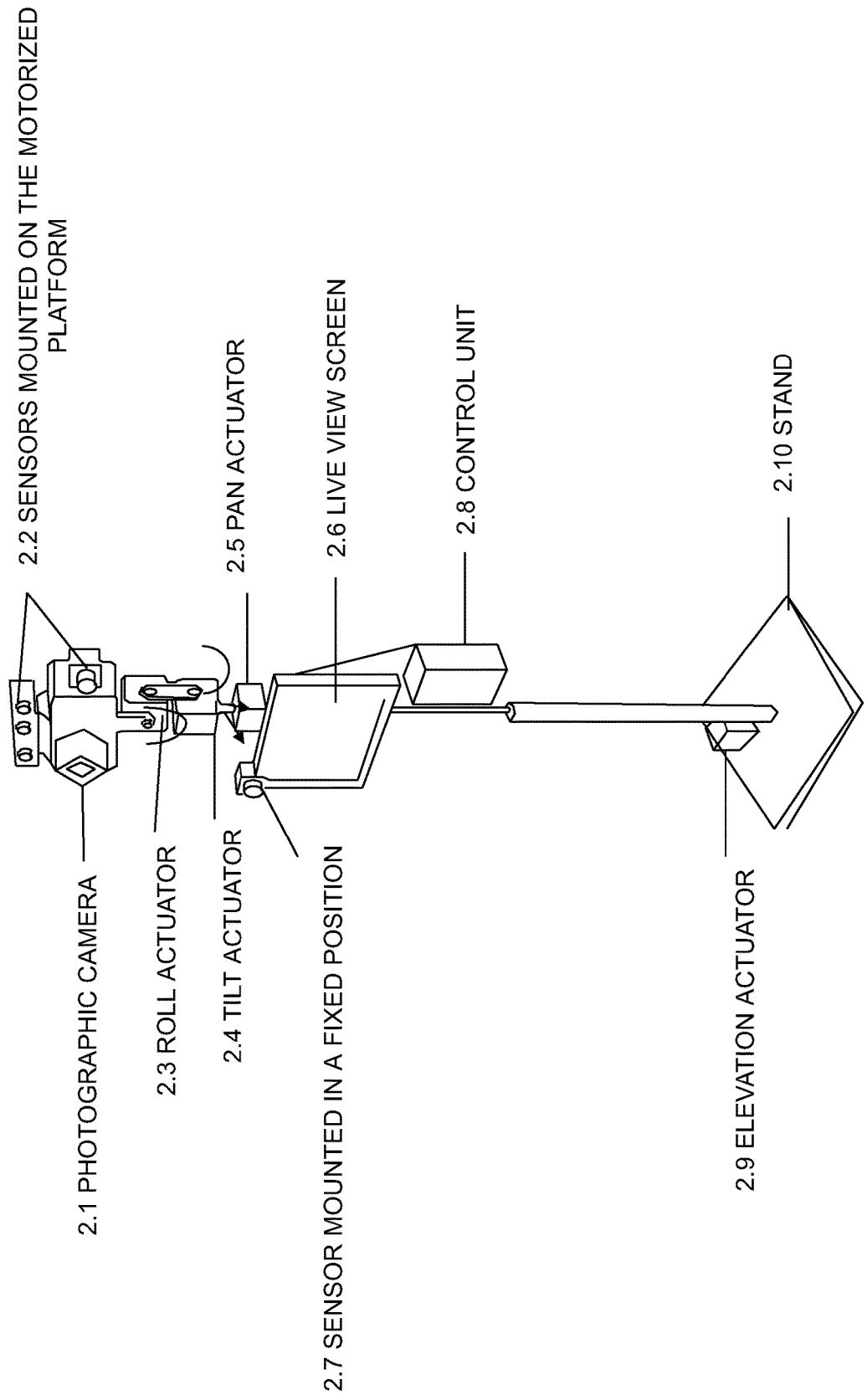
FIG. 2
Figure 3:
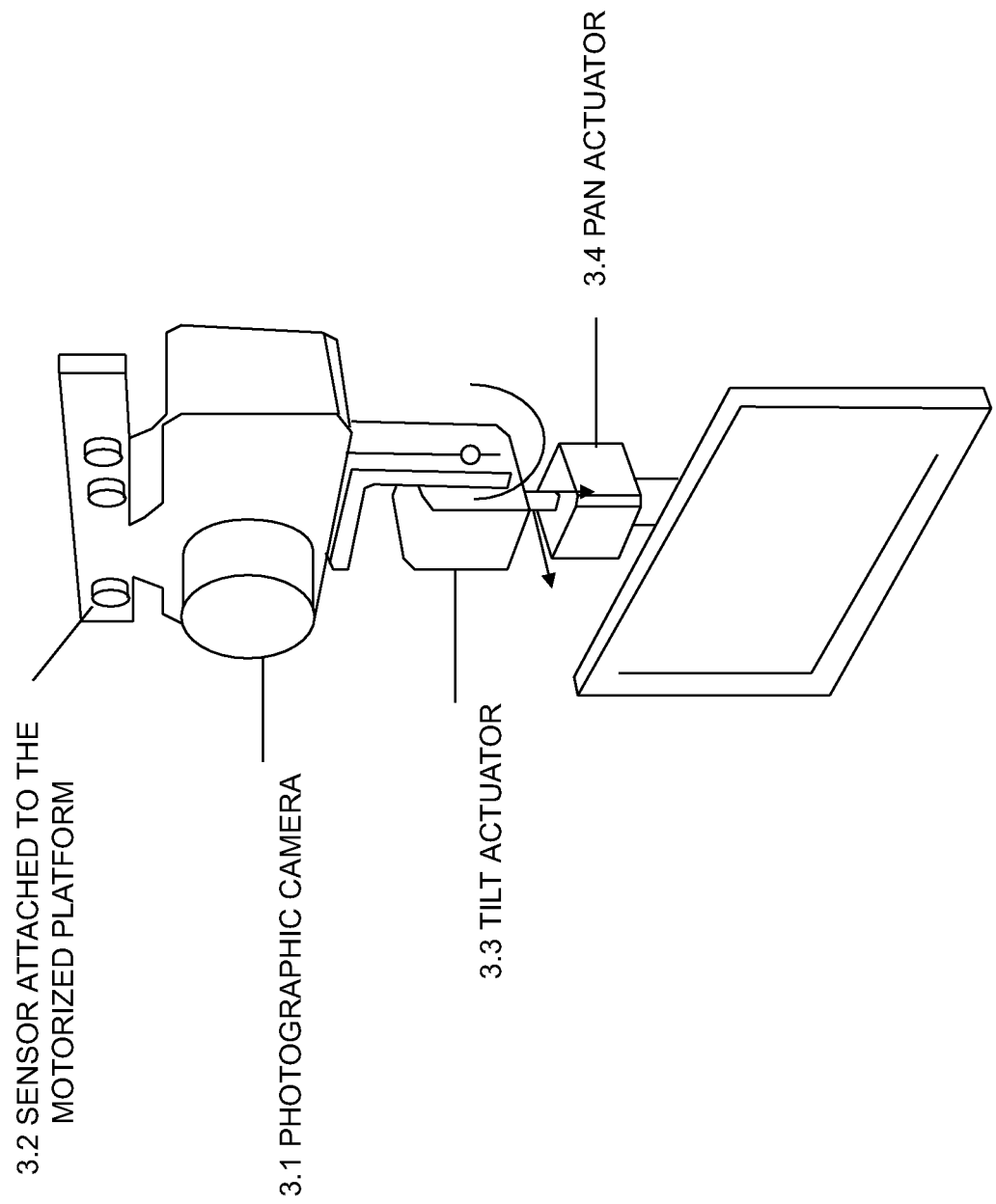
Figure 4:
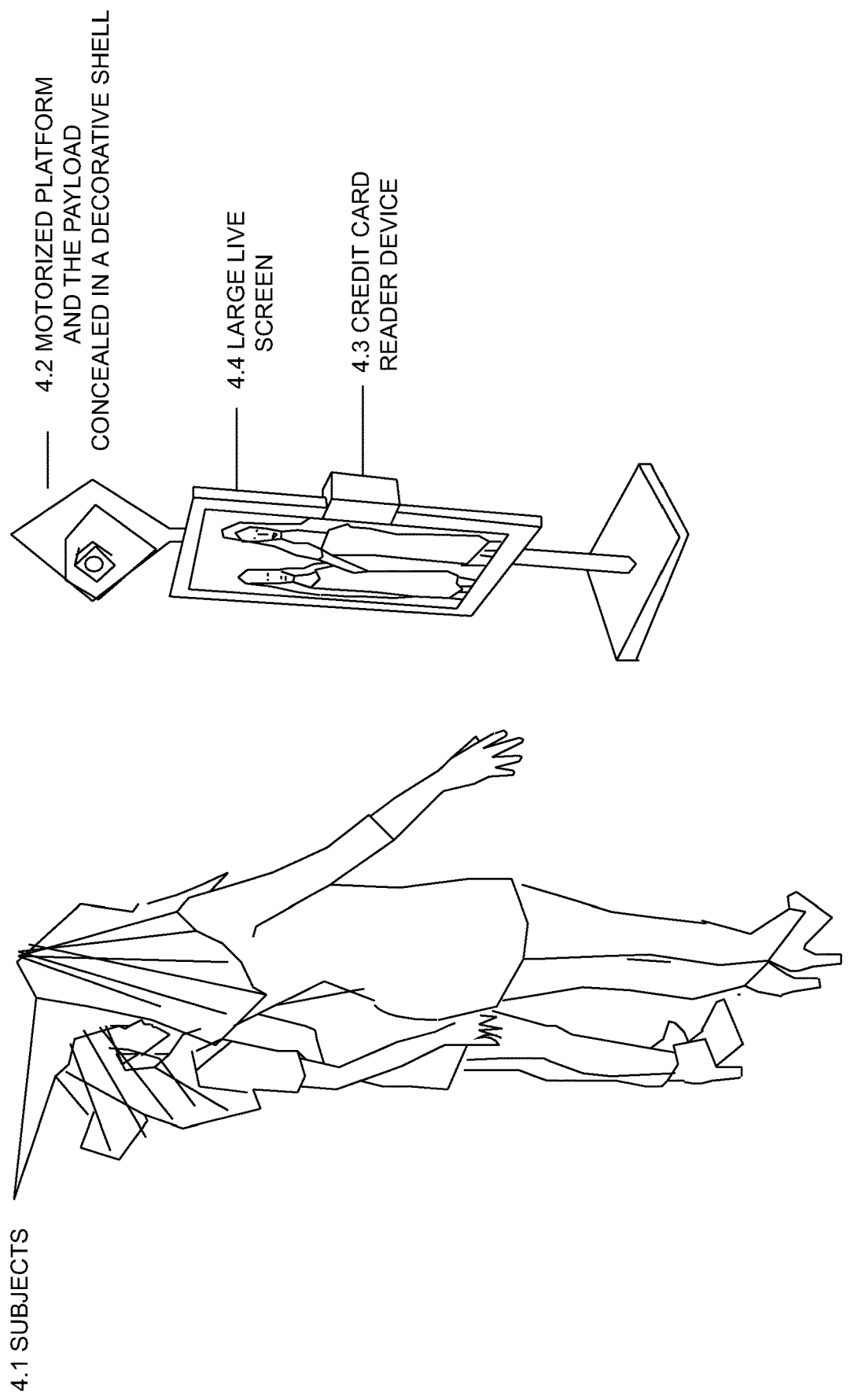
Figure 5:
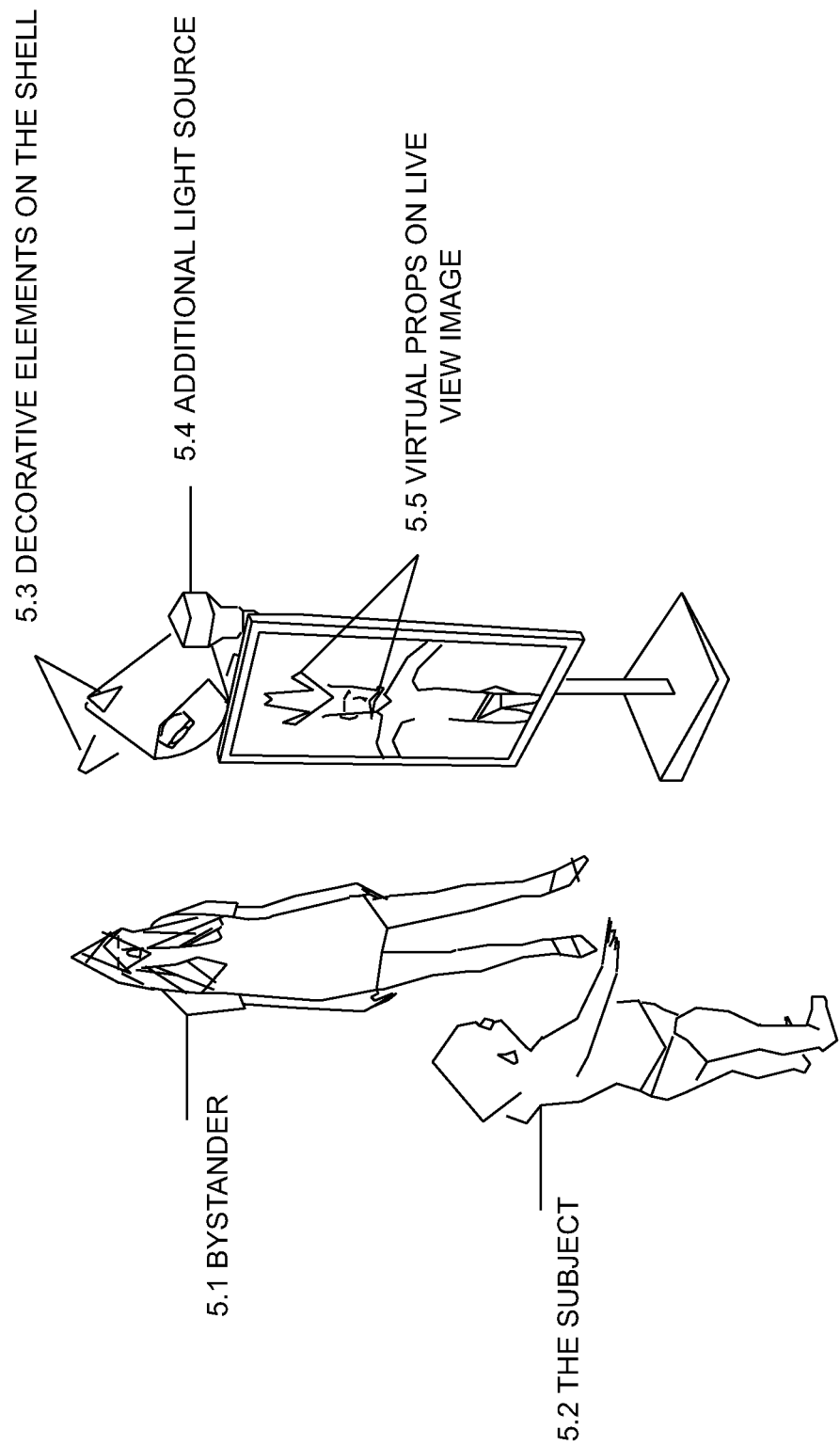
Figure 6:
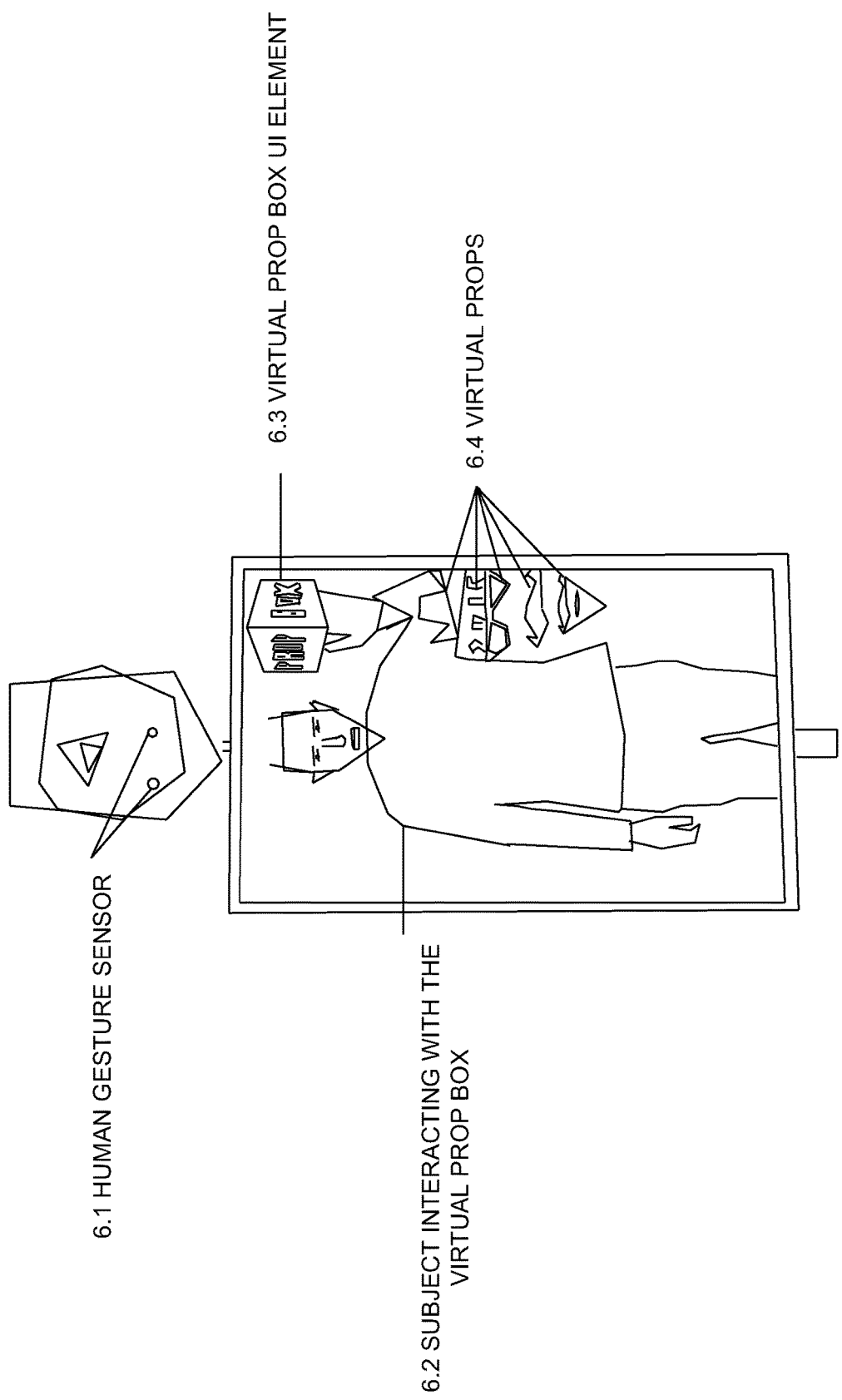
Figure 7:
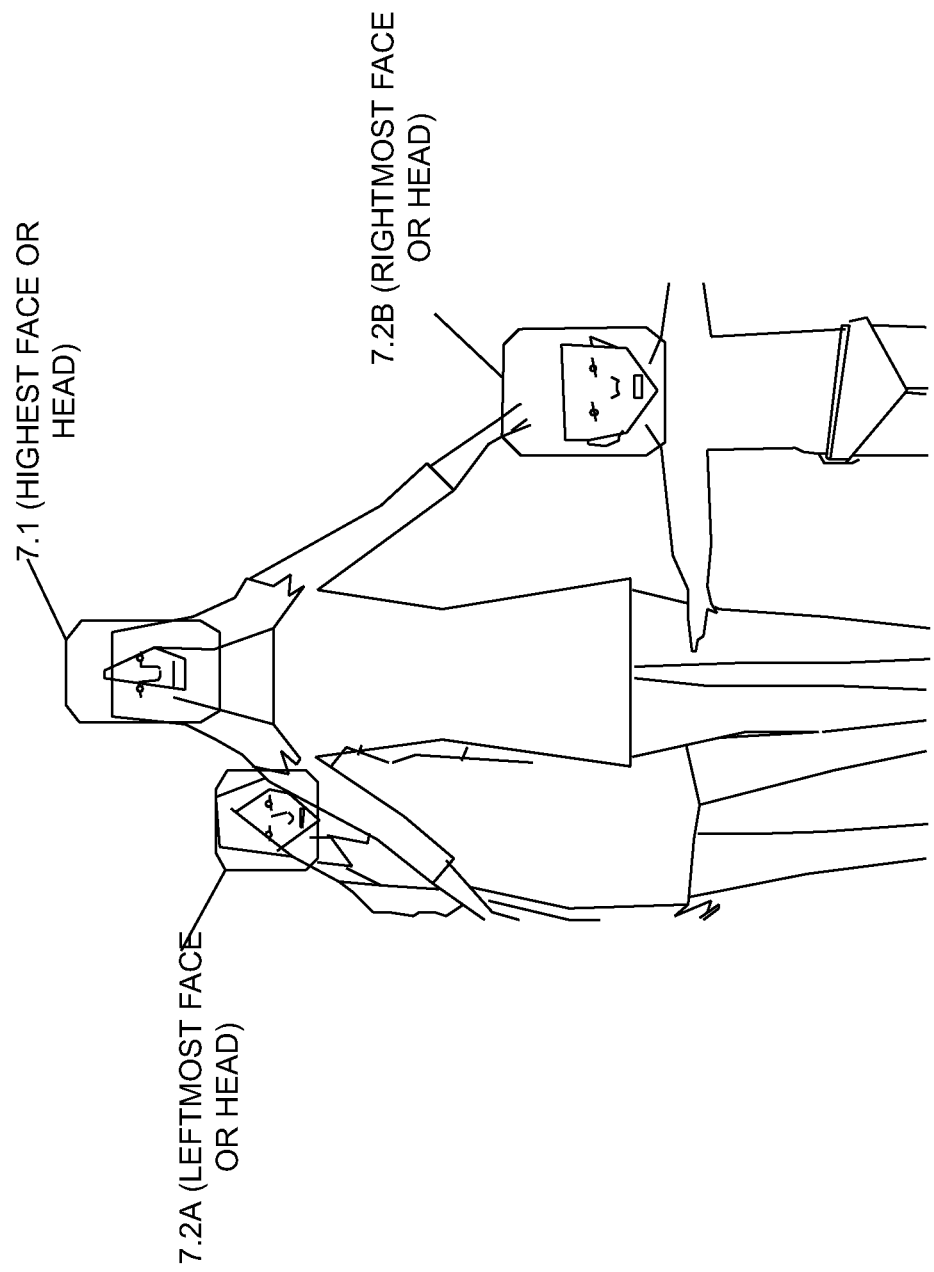
Figure 8:
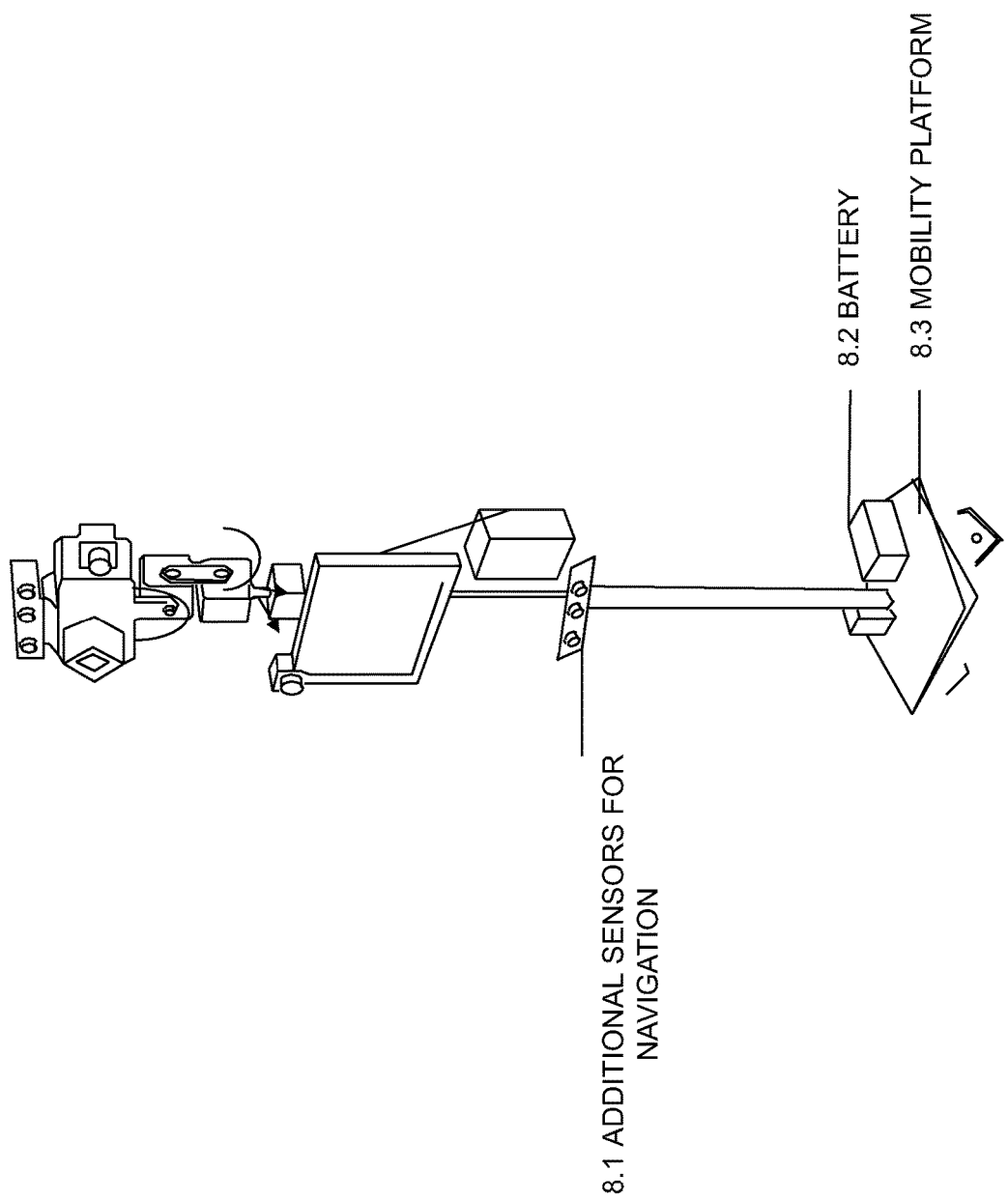

Schematic depiction of a Robotic Photo booth with a motorized platform with 4 degrees of freedom, sensors on the motorized platform and the live view screen.

2.1 Photographic camera 2.2 Sensors mounted on the motorized platform, thus moving together with the Photographic Camera 2.3 Roll actuator that allows camera and the payload be rotated around the "portrait-landscape" axis 2.4 Tilt actuator that allows camera and the payload be rotated around the horizontal axes (also known as pits, pointing up or down)

2.5 Pan actuator that allows camera and the payload be rotated around the vertical axis (also known as yaw, looking from side to side)

2.6 Live view screen that displays what photographic camera sees in real time, thus allowing people compose themselves as if looking into the mirror 2.7 Example of an optional sensor that's not connected to the motorized platform, but still utilized by the control algorithms 2.8 Control Unit for processing the sensor data, interpreting user's actions and directing the motorized platform 2.9 Elevation actuator to raise or lower the payload along the vertical axis 2.10 Stand

FIG. 3

Motorized platform with limited (two) degrees of freedom 3.1 Photographic Camera 3.2 Sensor attached to the motorized platform (moving with the photographic camera)

3.3 Tilt Actuator 3.4 Pan actuator

FIG. 4

Realistic-looking Robotic Photo booth on a stand with large live view screen, a credit card reader and a decorative shell concealing the motorized platform and its payload (sensors and the photographic camera). Control unit is also hidden behind the screen for aesthetic reasons.

4.1 The subjects interacting with the Robotic Photo booth.

4.2 Decorative shell resembling a head containing the motorized platform, the photographic camera and the sensors. On this picture, the Control Unit has already turned towards the subjects so that they appear in the middle of the live view screen.

4.3 Card reader device. An example of an optional payment device that can be configured to activate the Robotic Photo booth upon subjects swiping a card such as a magnetic credit card, club card, etc.

4.4 Live view screen. An example of a large live view screen in portrait orientation. Subjects see themselves as if in the mirror and have a chance to compose themselves, e.g. strike a pose, before the Robotic Photo booth takes the picture.

FIG. 5

Realistic-looking Robotic Photo booth on a stand with large live view screen, a light source, decorative elements on the shell and virtual props 5.1 Bystander. A person not interacting with the Robotic Photo booth 5.2 The subject. In this case a child, interacting with the Robotic Photo booth 5.3 Decorative elements, in this case ears attached to the shell to enhance the user experience by adding 'personality' to the Robotic Photo booth 5.4 Additional light source such as a photographic flash or a studio strobe. In this case, attached to the body of the Robotic Photo booth. More light sources can be optionally placed anywhere in the environment.

5.5 Virtual props overlaid on the subject in real time. In this case a mustache and a hat.

FIG. 6

Virtual Prop Box. Human gesture sensors detecting the virtual 'touch' on the live image of the rendering of the prop box icon and allowing user pick a prop 6.1 Human gesture sensor. Typically a depth sensor such as structured light, time of flight or stereo pair.

6.2 Human subject reaching to 'touch' the virtual prop box icon on the live view image 6.3 Rendering of the virtual prop box on the live image 6.4 Virtual props 'contained' inside the virtual prop box. The human subject can reach any one of those props with another hand gesture to 'pick up' and place the rendering of the virtual prop on top of oneself or elsewhere in the environment if appropriate (e.g. if the virtual prop is a non-wearable object, such as a car or an airplane, or a character)

FIG. 7

Automated Composition rules followed by the Robotic Photo booth.

7.1 The highest face or a head on vertical axis determines the headspace (distance between the top of the frame and top of the subject's head)

7.2 The center of the frame is chosen as the midpoint between leftmost and rightmost subject's face (or their heads, whichever is more readily detected by the sensors)

FIG. 8

Robotic Photo booth on a mobile platform 8.1 Additional sensors used in navigation (e.g. for obstacle avoidance, mapping)

8.2 Battery used as a power source for all electrical and electro-mechanical components of the Robotic Photo booth.

Figure 9:
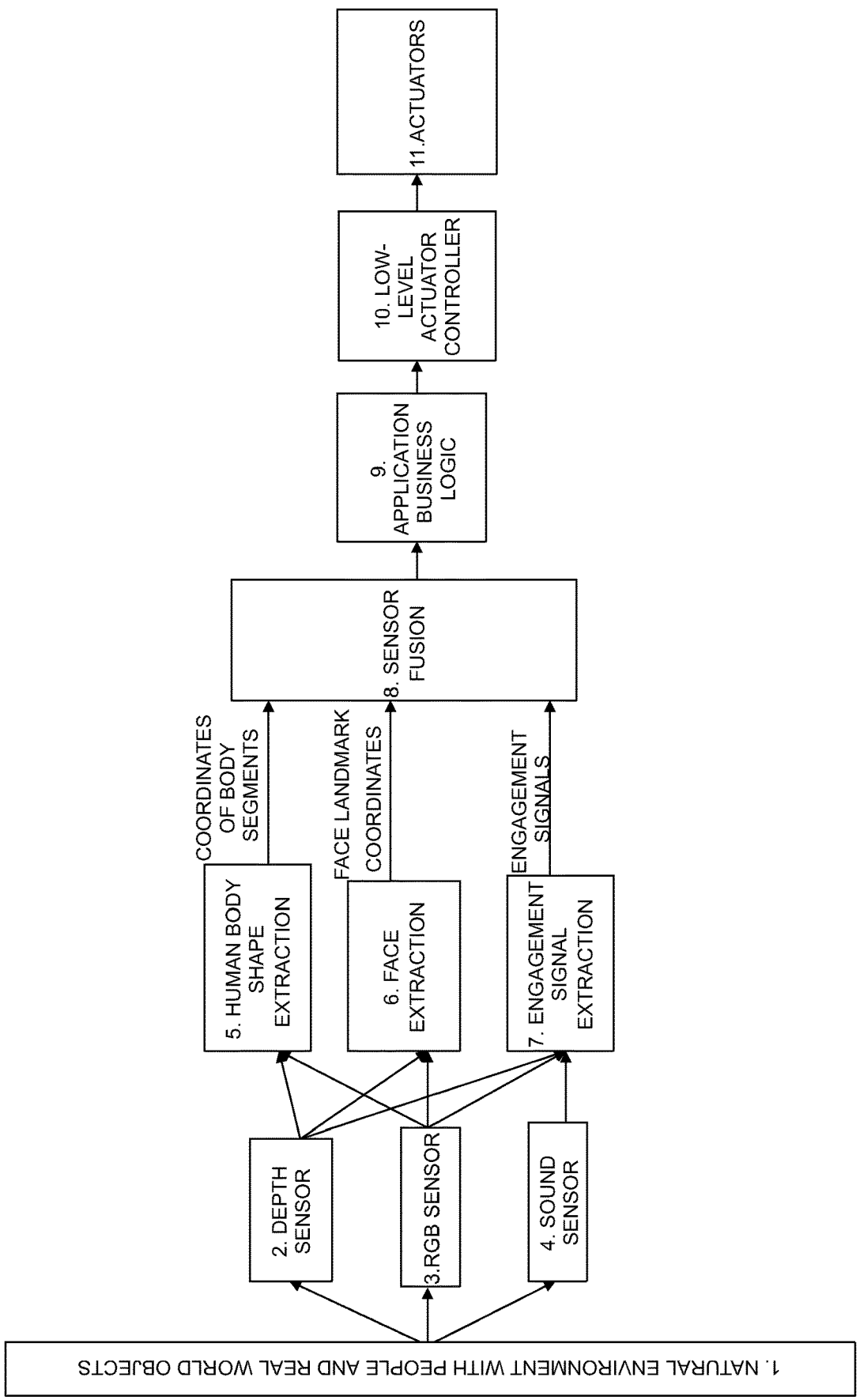

8.3 Mobility platform. In this case a differential drive system that can freely move across FIG. 9 depicts a summary of an embodiment of the workflow and interaction of the robotic system as depicted in multiple embodiments.

FIELD OF INVENTION

This invention is an improvement to commercial photo booth devices commonly used at events, parties and in various retails settings for the entertainment and promotional purposes. More specifically, this invention adds robotic automation to the photo booth operation by means of employing sensors to detect subjects of interest in the environment, control logic to analyze the sensor input, and actuators (e.g. motors) capable of moving the photographic camera as directed by the control logic to follow the human subjects, compose a frame and trigger the photographic camera, thus creating a fully autonomous photo framing and picture taking apparatus, which, in contrast to presently available photo booths, requires no explicit human action (such as pressing buttons on a touch screen or following instructions) to operate.

The main advantages of this invention over a traditional photo booth are:

It creates a more engaging and natural user experience for all age groups, since no instructions are needed—people (toddlers to adults) just pose as they would if the photographer were a human, and the Robotic Photo booth moves the camera and triggers the shot on its own.

It requires no human attendant often deployed along with the photo booth giving directions or assisting users. On one hand this makes it more economical to own a Robotic Photo booth for commercial purposes, but it also often results in increased user participation, since some people may shy away or be otherwise unwilling to interact with a human attendant Unlike a traditional photo booth, it requires no user input devices such as keyboards, touch screens and remote controls, along with instructions on how to use those devices, thus making it a more accessible technology that can be enjoyed by people of all ages, mental states, ability levels, literacy, and cultural backgrounds.

DETAILED DESCRIPTION

In this invention, we describe an automated photo booth, that uses sensors to detect subjects on the scene, actuators (such as motors) to move the photographic camera to a desired position, and computer algorithms to analyze sensor information, detect the point in time when a photograph is appropriate to take and trigger the photographic camera automatically. We refer to this invention as a Robotic Photo booth. It entirely eliminates the need for manual operations which, in the current state of the art photo booths, are carried out either by the patrons (users willing to have their photos taken) or photo booth attendants (typically employees of the organization affiliated with the photo booth).

The end-to-end user experience with the Robotic Photo booth is as simple as:

User approaches, or walks by the Robotic Photo booth

Robotic Photo booth detects the person, and turns it cameras towards the user, while simultaneously displaying a live view of what the photographic camera sees The user notices the device and decides to engage with or explore the apparatus While looking at the live view screen, user strikes a pose as though looking at the mirror reflection of oneself Robotic photo booth takes a picture and displays the resulting image, optionally with appropriate promotional material and/or instructions on how to obtain the photograph that's just been taken.

In addition to a simplified, natural user experience, Robotic Photo booth can perform all functions of a traditional photo booth including, but not limited to:

Being deployed in a privacy booth

Being positioned in front of a backdrop

Printing photographs on a photo printer

Sharing the images and videos on the social media

Charging end-users for the service

Allowing users to wear props, and others

The Motorized Platform

In a Robotic Photo booth, a photographic camera is attached to a motorized platform controlled by a computer that allows any payload to be physically repositioned along one or more of its rotational and translational degrees of freedom, such as:

Pan. Change the angle of the camera around the vertical axis (defined as the vector along which gravity acts on earth). Also known as Yaw.

Tilt. Change the angle of the camera around the horizontal axis. Also knows as Pitch Roll. Change the angle of the camera around the axis that defines portrait to landscape orientation of the camera Elevation. Change the height of the camera off the floor.

The motorized platform is designed such that it can be electronically controlled from a Control Unit, such as a computer or a microcontroller, to move the payload attached to it along any combination of its degrees of freedom to a desired position and orientation. In case of the Robotic Photo booth, the main payload is the photographic camera, and optionally any sensors, light sources and decorative elements needed for a functional and engaging photo booth operation.

The electro-mechanical properties of the Motorized platform allow repositioning of its payload with speed and agility comparable to those of a human photographer, thus allowing for an efficient and engaging end user experience.

The motorized platform can be designed to have only a limited subset of theoretically possible degrees of freedom. For example, the Roll and Elevation actuation can be eliminated, or fixed at certain values thus allowing free movement of the payload only along the pan and tilt angles. An embodiment of such design would be a pan/tilt platform rigidly mounted on a tripod set at a certain height, and having a camera fixed in portrait or landscape orientation. A motorized platform with limited degrees of freedom is still a valid embodiment of this invention, as long as it is automatically controlled by the Control Unit.

The primary function of the motorized platform is to allow autonomous, computer-controlled repositioning of the photographic camera for the purpose of composing a photograph. Furthermore, the motorized platform can be used to actuate a plurality of other objects attached to it for functional or decorative purposes. For example, enclosing the photographic camera in a shell resembling a human, animal or fictional character head can be more aesthetically pleasing. It can also aid in protecting equipment from being stolen or damaged, and ensure people are safe from coming in contact with electrical wires and motors. Similarly, attaching physical objects, attributes and accessories typically associated with human, animals or a fictional characters to a moving motorized platform, such as hands, ears, tails, hair, masks, hats, helmets, etc., may enhance the entertainment value and the attractiveness of the Robotic Photo booth to specific audiences, thus once again resulting in a more valuable product.

The Stand

The motorized platform can be mounted on a fixed structure, such as a wall of a building, or it can be attached to a dedicated, portable stand such as a tripod or a housing specifically designed for the photo booth. A dedicated stand or the housing provides a platform for mounting the components of the Robotic Photo booth (e.g. the Motorized Platform along with its payload, the screen, light sources, etc.) at a certain height for optimal view angle (e.g. at a near human height), as well as allows the Robotic Photo booth to be easily moved between locations. For example, the housing can be designed such that all components of the Robotic Photo booth are contained inside it or mounted on it, thus allowing for an easy transportation, a quick setup at a new location, an aesthetically pleasing look, protection from external elements and damage (such as weather, or people at the event) or combination thereof.

Furthermore, the stand can itself be mounted on top of a mobile platform such as a wheeled differential drive system. In this embodiment, the Robotic Photo booth can freely move throughout the environment while performing its functions. The power source for such roaming Robotic Photo booth is a battery such as a rechargeable lead-acid or lithium-Ion, which powers all of the electrical components of the photo booth such as the motors, the Control Unit, the camera and the lights. In this embodiment of the Robotic Photo booth, the sensors and the actuators used for composing a photograph may overlap with sensor and actuators used for mobility of the Robotic Photo booth. For example, the sensors used to detect human subjects on the scene to be photographed can also be used to detect and avoid obstacles. Similarly, the actuators that moving the Robotic Photo booth across the floor can also be used to turn the body of the Robotic Photo booth (along with the photographic camera) towards subject, thus replacing or aiding the pan actuator on a Motorized Platform.

Sensors

Robotic Photo booth employs electronic sensors to collect information about the environment (such as a room in which photo booth is operating), detect people in that environment, analyze their actions (such as gestures, motion), determine positions of people and obstacles, estimate people's intentions and decide appropriate actions that the robotic photo booth takes in real time.

For the purposes of this invention, a sensor is defined as an electronic device producing an output that can be interpreted by a computer algorithm on a computer processor or a microcontroller to extract information about the environment (e.g. a room) and subjects in it. Sensors used to detect people and faces include: video cameras (also referred to as RGB cameras), depth and stereo cameras (such as structured light, Time-Of-Flight or RGB stereo pairs), far infrared (heat) sensors, infrared and ultrasound proximity sensors, weight and pressure sensors, sound sensors (microphones and microphone arrays), motion sensors and others.

Sensors used to gather information about the environment that can aid the functionality of the Robotic Photo booth include GPS and other global or local positioning solutions Light sensors Magnetic sensors Gyroscopes, and others Such environment-specific sensors can aid the general functionality of the robotic photo booth, for example, knowing that the Robotic Photo booth is deployed at a stadium vs a private residence can be used to optimize the behavior of the Robotic Photo booth from a "low traffic portrait photographer" to a "crowd photographer", which can mean higher rate of shots taken, wider zoom level on the lens, etc.

Furthermore, a plurality of sensors of the same type or sensors of different types can be used simultaneously to accomplish the end goal of detecting and locating subjects of interest on the scene, or doing so with a higher degree of precision, accuracy or reliability. For example, in one embodiment of a Robotic Photo booth a depth camera (distance sensor array) and RGB (video camera) sensor are used simultaneously to compensate for the non-overlapping weaknesses of each sensor type; an infrared structured light depth sensor is susceptible to noise from infrared radiation emitted naturally by the Sun or present in the environment from other infrared radiation sources (incandescent light bulbs). However, that type of sensor works well (has a high signal/noise ratio) even in a very dark environment. By contrast, the RGB video cameras typically produce a better (less noisy) signal in a well-illuminated environment, and quality degrades as the light level drops off, which means the face detection algorithms that utilize RGB images perform best in well-lit (even by sunlight) environments. Combined, those two sensor types cover a wide range of environments where the overall system performs well.

Similarly, a microphone array can be used to detect sound or voice sources and turn the motorized platform such that the source can be further evaluated by the RGB and/or depth sensors.

Said sensors for detecting subjects can be attached to the motorized platform, thus moving with the photographic camera, attached somewhere else to the photo booth device in a fixed position (i.e. the stand or the screen), placed in an external environment (e.g. ceiling cameras observing the scene from the top), or combination thereof. Regardless of the sensor location, as long as the information generated by the sensors is used to analyze the scene for the purposes of automating a photo booth operation—it is a valid embodiments of this invention.

Control Unit

The Control Unit is any computer or microcontroller-based computation device with digital input ports, such as USB or GPIO to receive sensor signals, a processor unit for processing sensor data, and digital outputs for controlling lower level electronic components such as motors and other actuators, light sources, sound sources and digital displays such as computer or TV screens. The Control Unit performs those functions using software programs designed to operate a Robotic Photo booth. Therefore, when referring to the Control Unit, we also imply the software and the algorithms that process sensor information, make automated decisions in real time (such as where to move the motorized platform, when to trigger the picture, how to process the resulting image, etc.) and direct the lower-level hardware (such as controllers, motors, light sources, the photographic camera, etc.) to accomplish the function of an automated and autonomous photo booth.

Sensor's output, fundamentally, is an electronic signal that can be interpreted by the software algorithms running on the Control Unit. For the purposes of this invention, the specific signal properties and data formats produced by the sensor are irrelevant. Any sensor used in a photo booth in conjunction with a Control Unit to automate the operation of a photo booth is a valid embodiment of this invention. Such automation includes:

- re-positioning of the photographic camera
- triggering a photographic camera (taking a picture)
- moving parts, such as a head, arms or other decorative elements of a photo booth
- zooming the lens of a photographic camera in or out to achieve a more pleasing final image, e.g. when distance sensors detect that subjects are farther away, the Robotic Photo booth may physically zoom in the photographic camera lens, or achieve the same result by applying digital zoom
- turning on or off lights or other electronic devices such as screens needed to operate a photo booth or attract people's attention
- displaying messages, such as text or videos on the screen
- producing sounds such as music, voice or sound effects
- determining creative effects (i.e. artistic filters) to be applied to the digital images
- altering the behavior of the Robotic Photo booth in response to gestures, poses, actions, sounds, facial expressions and other information associated with humans that's been detected by the sensors
- altering the behavior of the Robotic Photo booth in response to the properties of the environment, such as furniture, obstacles, lighting conditions and sounds so that the Robotic Photo booth is more effective in detecting where people are on the scene, adjusting the parameters of the photographic camera (i.e. ISO sensitivity), deciding when to display promotional material, etc.

Once people on the scene have been detected using any of those sensors, the Control Unit may look for additional factors that can be used to decide the operation of the Robotic Photo booth, such that it appears more intelligent, sensitive to socially-accepted signals, non-intrusive, etc. For example, "Positive" signals are interpreted by the Robotic Photo booth as the willingness of subjects to be photographed. In this case, the Robotic Photo booth can engage with the subjects by means of starting to follow them (i.e. turning the motorized platform along with the photographic camera towards subjects), and eventually triggering the photographic camera to take a picture. Such positive signals include, but are not limited to:

- People looking at or in direction of the photo booth
- People standing directly in front of the photo booth
- People facing the photo booth (subject's body is turned towards the photo booth)
- People waving hands, or pointing at the photo booth
- People making voice remarks typically associated with calling attention to themselves, such as "Hey" or "Here". (This is an example of culture and language-specific interaction model, which will depend on the location where the photo booth is deployed.)
- People striking poses typically observed when humans know they are being photographed
- People smiling
- People making atypical (i.e. funny-looking) faces
- People assembling in tight groups, facing the Robotic Photo booth "Negative" signals, which can be used to dis-engage the tracking and/or engagement with subjects or suppress triggering of the photographic camera, include but are not limited to:

- Detecting when people are engaged in a conversation with each other and therefore do not appear to be interested in being photographed
- Detect that people are facing away from the camera, or people's faces are otherwise obscured
- Detect when people appear moving (e.g. walking) towards, from or across the field of view of the photo booth, thus likely just passing by
- People covering their faces Furthermore, the Robotic Photo booth may be configured by the owner of the device to recognize certain signals (e.g. hand gestures) from people on the scene to enable or disable specific functionality of the Robotic Photo booth, or to refine its behavior. For example, the Robotic Photo booth may be configured to recognize a raised hand gesture as a "permission" to start the tracking and photographing process. Without said gesture, the Robotic Photo booth can be configured to not track and/or photograph subjects automatically. This functionality can be used in certain environments where an uninvited shooting is undesirable. Similarly, the Robotic Photo booth may be configured such that certain gestures are recognized as an invitation to prioritize some people on the scene over others. For example, with multiple people in the field of view of the robotic photo booth's sensors, preference will be given to those who wave or raise a hand.

After the sensor information is processed by the Control Unit, commands are further transmitted to the motorized platform and the photographic camera function such that the resulting photographic frame is close to what human experts would consider an optimal composition. Examples of such compositions include, but are not limited to:

- Subject's face appears in the middle of the frame along the horizontal axis.
- An optimal headroom is preserved (e.g. as defined by the so called "rule of thirds"), where headroom is defined as the vertical position of the subject's face relative to the frame and the subject's eyes should be positioned about one-third of the way down from the top of the frame.
- In a group photo, where multiple subjects are posing to be on the same photo, the center of the frame appears at a mid-point between subjects' faces along the horizontal axis.
- For a group photo, the face that's higher than everyone else's (i.e. the tallest person) determines the headroom to observe when framing a shot Photographic Camera Photographic camera is defined as any electronic or electro-mechanical device capable of producing a visual image on a digital, film or other media. This includes dedicated digital cameras, such as digital SLRs, compact point and shoot cameras, web cameras, tablet and phone cameras, dedicated RGB sensors, etc. Any digital imaging device mounted on a sensor-driven motorized platform with an intention of automating a photo booth operation is a valid embodiment of this invention.

Photographic Camera in Video Mode

Modern photographic cameras are capable or recording video clips with sound. A Robotic Photo booth capable of recording a video in addition to or instead of still photographs is a valid embodiment of this invention. The functions of the motorized platform, sensors and the Control Unit remain unchanged to the extent that they detect the subjects on the scene, aim the video camera towards subjects, compose a frame, start and stop recording automatically and determine the appropriate frames in the video stream to include in the final video clip (e.g. include several seconds of video footage surrounding a point in time when subjects are facing the Robotic Photo booth or interacting with it by gestures or facial expressions)

The Screen

To allow for a better user experience, the live (real time) picture as seen by the photographic camera or other visual sensors can be projected onto a screen so that subjects can see themselves as though in a mirror, and have a chance to prepare before a the shutter is released.

In addition to the live view of the scene, the screen can also be used to display other content such as:

Description of the Robotic Photo booth functions

Instructions on how to obtain the photographs taken by the Robotic Photo booth

Promotional material (i.e. advertisement)

Digital art, such as virtual props (hats, glasses, mustache clothing, etc) overlaid in real time on top of the live picture and the photographs displayed on the screen.

User interface for the operator of the Robotic Photo booth to configure the Robotic Photo booth software Legal disclaimers (i.e. photo sharing and retention policies)

Other Activation Models

A Robotic Photo booth can be configured as a vending-machine style apparatus, where an explicit payment event, such as depositing coins or paper currency, magnetic card swiping or a mobile phone-based payment, etc., are required in order to activate the Robotic Photo booth. In this modality, a Robotic Photo booth can operate for a certain amount of time, or a certain number of photographs before becoming inactive again. Other methods of ensuring the Robotic Photo booth only renders its services when appropriate include, but are not limited to:

A specific activation date and time. For example, the Robotic Photo booth may be configured by its owner to operate only between certain hours during the event, and remain passive otherwise.

A specific visual tag. For example, the Robotic Photo booth may be configured by its owner to recognize specific visual tags, such as badges worn by the attendees, and engage only those subjects wearing those tags, while ignoring other subjects.

User Experience Improvements

Being an entertainment device, a Robotic Photo booth may employ plurality of other techniques to enhance the user experience of interacting with an intelligent robotic device. Those techniques include, but are not limited to:

Emitting sounds that resemble robotic actuators, e.g. motors. Those sounds could be produced naturally, during normal operation of the actuators used in Robotic Photo booth, or can be synthesized electronically and emitted from the sound speakers.

Generating speech to attract human subjects. For example, once sensors detect reliably an age group and the gender of the subject, a targeted voice prompt may be generated to attract the subject, such as "Hey, tall boy, let me take your photo".

Generating speech commands to direct human subjects to behave in a certain way. For example, if the Robotic Photo booth detects that human subjects are too close to the camera, a voice command may be generated such as "Hey guys, please move back so I can see you"

Allowing users pick and arrange virtual props on top of their live view images and photos. For example, sensors and the control unit can recognize certain hand gestures as an intent by the subjects to use props (such as signage, hats, glasses, mustache, etc). In this case, a computer-generated replica of a prop can be superimposed on top of the live view image of the subject projected on the screen, thus making it appear as through the subject is wearing, holding or otherwise using said prop. Other gestures can be used to remove, reposition or cycle through (e.g. change the appearance) of the digital prop. Furthermore, virtual prop bins (e.g. lockers where props are stored) can be displayed at certain locations on the live view screen, for example near the top corners of the image. In this case, a hand gesture by the subjects that reaches into those bins, will result in opening those bins and allow users of the Robotic Photo booth pick a desired prop and overlay it on top of themselves.

Using sensor information to automatically apply artistic effects and quality correction to the images taken by the photo booth. For example, it is known that close up portrait photographs often look best in black and white—so the control unit may use the distance sensor information to apply black and white photographic filter to portrait photographs taken at close distances. Similarly, if an additional light source is located close to the photographic camera, photographs of subjects captured from farther away may come out dark. In this case, the Control Unit may use the distance sensor (i.e. depth camera) data to boost the ISO (light sensitivity) of the photographic camera intelligently prior to the image capture.

Furthermore, specific events can benefit from different "personalities" or the Robotic Photo booth. Such plurality of "characters" or "personalities" can be used to make the Robotic Photo booth better fit the environment in which it operates. For example, at a kid's birthday event, the Robotic Photo booth can impersonate a clown, behaving in a manner that's suggestive of a silly personality (i.e. shaking a head, arms, producing visual, sound and voice effects attributable to children's entertainer). At a Halloween event, actuation, visual and sound effects can impersonate a 'spooky' character, at a formal reception—a professional photographer, etc. Such personalities can be pre-programmed and made available for the operator of the Robotic Photo booth to choose from before the Robotic Photo booth is activated for an event, or the Robotic Photo booth can use information from its sensors to estimate the environment and pick an appropriate "persona" automatically. For example, if the Robotic Photo booth detects that the majority of subjects are children (i.e. judging from subject's height)—it may automatically switch to a clown personality. Similarly, if the robotic photo booth is deployed on a Halloween day, it may switch to a "spooky" persona. Such automated personality change can be made user-configurable and culture-specific. E.g. if the Robotic Photo booth is deployed in China, it would be aware of the Chinese New Year and can assume a festive personality, but the same Robotic Photo booth activated in the US on the same date—may not automatically assume the same personality.

The invention claimed is:

1. A robotic interactive system for automatically capturing an image of a subject and an environment of the subject, comprising:

at least one sensor that collects sensor data about at least one of the subject and the environment;
a motorized platform that comprises at least one actuator for repositioning a payload that includes a camera, wherein the motorized platform is configured to reposition the payload along at least one rotational or translational degree of freedom selected from at least one of (i) a pan that changes an angle of the camera around a vertical axis, (ii) a tilt that changes the angle of the camera around a horizontal axis, (iii) a roll that changes the angle of the camera around an axis that defines a portrait to landscape orientation of the camera, and (iv) an elevation that changes a height of the camera along the vertical axis, wherein the motorized platform is fixed along at least one of the rotational or the translational degree of freedom and is not fixed along at least one of the rotational or the translational degree of freedom; and
a control unit that receives the sensor data from the at least one sensor, wherein the control unit includes a processor and a physical memory containing computer-executable instructions that, when executed by the processor, cause the processor to:
process the sensor data to identify at least one feature of the subject or the environment,
determine a composition based on at least one of a subject's face or a head, a subject's gesture, a subject's motion, a subject's pose, a subject's action, a subject's sound, and a subject's facial expression,
transmit at least one command to the motorized platform to control the at least one actuator to reposition the camera such that a resulting photographic frame more closely corresponds to the composition, and
automatically trigger the camera to capture the resulting photographic frame.

2. A robotic interactive system for automatically capturing an image of a subject and an environment of the subject, comprising:
at least one sensor that collects sensor data about at least one of the subject and the environment;
a motorized platform that comprises at least one actuator for repositioning a payload that includes a camera; and
a control unit that receives the sensor data from the at least one sensor, wherein the control unit includes a processor and a physical memory containing computer-executable instructions that, when executed by the processor, cause the processor to:
process the sensor data to identify at least one feature of the subject or the environment,
determine a composition based on at least one of a subject's face or a head, a subject's gesture, a subject's motion, a subject's pose, a subject's action, a subject's sound, and a subject's facial expression, wherein the composition is determined based at least in part on a position of the subject's face or head relative to the photographic frame, wherein the composition is determined to a position of eyes of the subject at a vertical position such that a ratio of distance between the eyes of the subject and a top of the photographic frame to a height of the photographic frame is about one third,
transmit at least one command to the motorized platform to control the at least one actuator to reposition the camera such that a resulting photographic frame more closely corresponds to the composition; and
automatically trigger the camera to capture the resulting photographic frame.

3. A robotic interactive system for automatically capturing an image of a subject and an environment of the subject, comprising:
at least one sensor that collects sensor data about at least one of the subject and the environment;
a motorized platform that comprises at least one actuator for repositioning a payload that includes a camera; and
a control unit that receives the sensor data from the at least one sensor, wherein the control unit includes a processor and a physical memory containing computer-executable instructions that, when executed by the processor, cause the processor to:
process the sensor data to identify at least one feature of the subject or the environment,
determine a composition based on at least one of a subject's face or a head, a subject's gesture, a subject's motion, a subject's pose, a subject's action, a subject's sound, and a subject's facial expression, wherein the composition is determined based at least in part on a position of the subject's face or head relative to the photographic frame, wherein when the subject comprises a plurality of persons, the composition is determined based on a vertical position relative to a top of the photographic frame of eyes of a person whose face is highest among the plurality of persons,
transmit at least one command to the motorized platform to control the at least one actuator to reposition the camera such that a resulting photographic frame more closely corresponds to the composition; and
automatically trigger the camera to capture the resulting photographic frame.

4. A robotic interactive system for automatically capturing an image of a subject and an environment of the subject, comprising:
at least one sensor that collects sensor data about at least one of the subject and the environment;
a motorized platform that comprises at least one actuator for repositioning a payload that includes a camera; and
a control unit that receives the sensor data from the at least one sensor, wherein the control unit includes a processor and a physical memory containing computer-executable instructions that, when executed by the processor, cause the processor to:
process the sensor data to identify at least one feature of the subject or the environment,
determine a composition based on at least one of a subject's face or a head, a subject's gesture, a subject's motion, a subject's pose, a subject's action, a subject's sound, and a subject's facial expression,
transmit at least one command to the motorized platform to control the at least one actuator to reposition the camera such that a resulting photographic frame more closely corresponds to the composition, and
automatically trigger the camera to capture the resulting photographic frame, wherein the processor extracts body shape data of the subject from at least one of a depth sensor, a Red Green Blue (RGB) sensor, a video camera, a RGB camera, a depth and stereo camera, a far infrared sensor, an infrared and ultrasound proximity sensor, a weight sensor, a pressure sensor, a sound sensor, and a motion sensor, wherein the processor obtains the sensor data of the environment from at least one of Global Positioning System (GPS), a global positioning solution, a local positioning solution, a light sensor, a magnetic sensor, and a gyroscope.

5. A robotic interactive system for automatically capturing an image of a subject and an environment of the subject, comprising:
- at least one sensor that collects sensor data about at least one of the subject and the environment;
- a motorized platform that comprises at least one actuator for repositioning a payload that includes a camera; and
- a control unit that receives the sensor data from the at least one sensor, wherein the control unit includes a processor and a physical memory containing computer-executable instructions that, when executed by the processor, cause the processor to:
  - process the sensor data to identify at least one feature of the subject or the environment,
  - determine a composition based on at least one of a subject's face or a head, a subject's gesture, a subject's motion, a subject's pose, a subject's action, a subject's sound, and a subject's facial expression,
  - transmit at least one command to the motorized platform to control the at least one actuator to reposition the camera such that a resulting photographic frame more closely corresponds to the composition, and
  - automatically trigger the camera to capture the resulting photographic frame, wherein if the at least one sensor detects a gesture by the subject, the instructions further cause the processor to superimpose a computer-generated replica of a prop on a live image projected onto a screen based on the gesture.

6. A robotic interactive system for automatically capturing an image of a subject and an environment of the subject, comprising:
- at least one sensor that collects sensor data about at least one of the subject and the environment;
- a motorized platform that comprises at least one actuator for repositioning a payload that includes a camera; and
- a control unit that receives the sensor data from the at least one sensor, wherein the control unit includes a processor and a physical memory containing computer-executable instructions that, when executed by the processor, cause the processor to:
  - process the sensor data to identify at least one feature of the subject or the environment,
  - determine a composition based on at least one of a subject's face or a head, a subject's gesture, a subject's motion, a subject's pose, a subject's action, a subject's sound, and a subject's facial expression,
  - transmit at least one command to the motorized platform to control the at least one actuator to reposition the camera such that a resulting photographic frame more closely corresponds to the composition, and
  - automatically trigger the camera to capture the resulting photographic frame, wherein the instructions further cause the processor to automatically determine a subject type of the subject selected from at least one of an age group, a gender, a height of the subject, and a distance of the subject from the camera, based on the sensor data about the subject collected from the at least one sensor, and generate a targeted voice prompt for the subject based on the subject type.

7. The robotic interactive system of claim 6, wherein the instructions further cause the processor to automatically select a pre-programmed persona based on the information about the environment collected from the at least one sensor, and generate a movement, and a visual or sound effect based on the pre-programmed persona.

8. A method for automatically capturing an image of a subject and an environment of the subject, using a robotic interactive system, wherein the robotic interactive system includes a camera and a control unit, the control unit includes a processor and a physical memory containing computer-executable instructions, the method comprising: collecting sensor data from at least one sensor with the processor, the sensor data including information about at least one of the subject and the environment from the at least one sensor; processing the sensor data, with the processor, to identify at least one feature of the subject or the environment; determining the composition, with the processor, based on at least one a subject's face or a head, a subject's gesture, a subject's pose, a subject's action, a subject's sound, and a subject's facial expression; transmitting at least one command, with the processor, to control at least one actuator in a motorized platform to reposition the camera to a position or orientation that is selected to obtain the composition of the photographic frame; and automatically triggering the camera, with the processor, to capture a resulting photographic frame based on the composition, wherein the processor controls the at least one actuator in the motorized platform to reposition the camera along at least one rotational or translational degree of freedom selected from at least one of (i) a pan that changes an angle of the camera around a vertical axis, (ii) a tilt that change the angle of the camera around a horizontal axis, (iii) a roll that changes the angle of the camera around an axis that defines a portrait to landscape orientation of the camera, and (iv) an elevation that changes a height of the camera along the vertical axis, wherein the motorized platform is fixed along at least one of the rotational or the translational degree of freedom and is not fixed along at least one of the rotational or the translational degree of freedom.

* * * * *